(12) United States Patent
Becker et al.

(10) Patent No.: US 8,382,481 B2
(45) Date of Patent: Feb. 26, 2013

(54) PROBLEM SHOOTING PROCESS INTELLIGENTLY ADAPTED TO FIT USER'S SKILLS

(75) Inventors: Sherilyn M. Becker, Waterloo, IA (US); Wei Hu, Madison, WI (US); Brad W. Pokorny, Rochester, MN (US); Jun C. Yin, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1304 days.

(21) Appl. No.: 12/131,569

(22) Filed: Jun. 2, 2008

(65) Prior Publication Data

US 2009/0299931 A1 Dec. 3, 2009

(51) Int. Cl.
*G09B 19/00* (2006.01)
*G06F 17/00* (2006.01)
*G06F 3/00* (2006.01)

(52) U.S. Cl. .......... 434/118; 434/219; 706/45; 715/705; 715/707

(58) Field of Classification Search .................. 434/118, 434/219; 706/45; 715/705, 707
See application file for complete search history.

(56) References Cited

U.S. PATENT DOCUMENTS

| 5,774,118 | A | 6/1998 | Hatakama | |
| 6,537,072 | B2 * | 3/2003 | Kanevsky et al. | 434/219 |
| 6,542,200 | B1 * | 4/2003 | Barcy et al. | 348/468 |
| 7,272,793 | B2 * | 9/2007 | Mutsuno et al. | 715/707 |
| 7,366,985 | B1 * | 4/2008 | McKeeth | 715/705 |
| 2004/0197759 | A1 | 10/2004 | Olson | |
| 2007/0118804 | A1 | 5/2007 | Raciborski et al. | |
| 2007/0224586 | A1 | 9/2007 | Massie et al. | |

FOREIGN PATENT DOCUMENTS

JP 2007025497 2/2007

* cited by examiner

*Primary Examiner* — Xuan Thai
*Assistant Examiner* — Jerry-Daryl Fletcher
(74) *Attorney, Agent, or Firm* — Suiter Swantz pc llo

(57) ABSTRACT

The present disclosure is directed to a method for automatically adapting the problem shooting steps to the user's skill level.

20 Claims, 3 Drawing Sheets

PROBLEM SHOOTING PROCESS INTELLIGENTLY ADAPTED TO FIT USER'S SKILLS

TECHNICAL FIELD

The present disclosure generally relates to the field of troubleshooting problems, and more particularly to a method for adapting a set of problem shooting steps to fit the user's skill level.

BACKGROUND

Many customer support and problem solving systems are designed with some assumptions of an ability of an average user, including the technical background and skills of the user. It is very difficult to access an estimate of the user's skill level. Even if a pretty good supporting level for the user is chosen, there are still common problems that either 1) more skilled users find the problem shooting steps filled with unnecessary details that are a waste of time, or 2) users with poor knowledge find the given clues and details are still not understandable to help them to solve the problem without assistance from customer service. One solution is configuring problem shooting steps that are more intelligently adapted to the user's skill level and composition.

SUMMARY

The present disclosure is directed to a method for automatically adapting the problem shooting steps to the user's skill level.

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Many customer support and problem solving systems are designed with some assumptions of what an average user should be able to do, including the technical background and skills of the users. Even if a pretty good supporting level for the user is chosen, there are still common problems that either 1) more skilled users find the problem shooting steps filled with unnecessary details that are a waste of time, or 2) users with poor knowledge find the given clues and details are still not understandable enough to help them to solve the problem without assistance from customer service. Therefore, there is a need to adapt the problem steps to the skill level of the user in order to efficiently resolve the user's problems. The present disclosure is directed to a method for automatically adapting the problem shooting steps to the user's skill level.

Figure 1A:
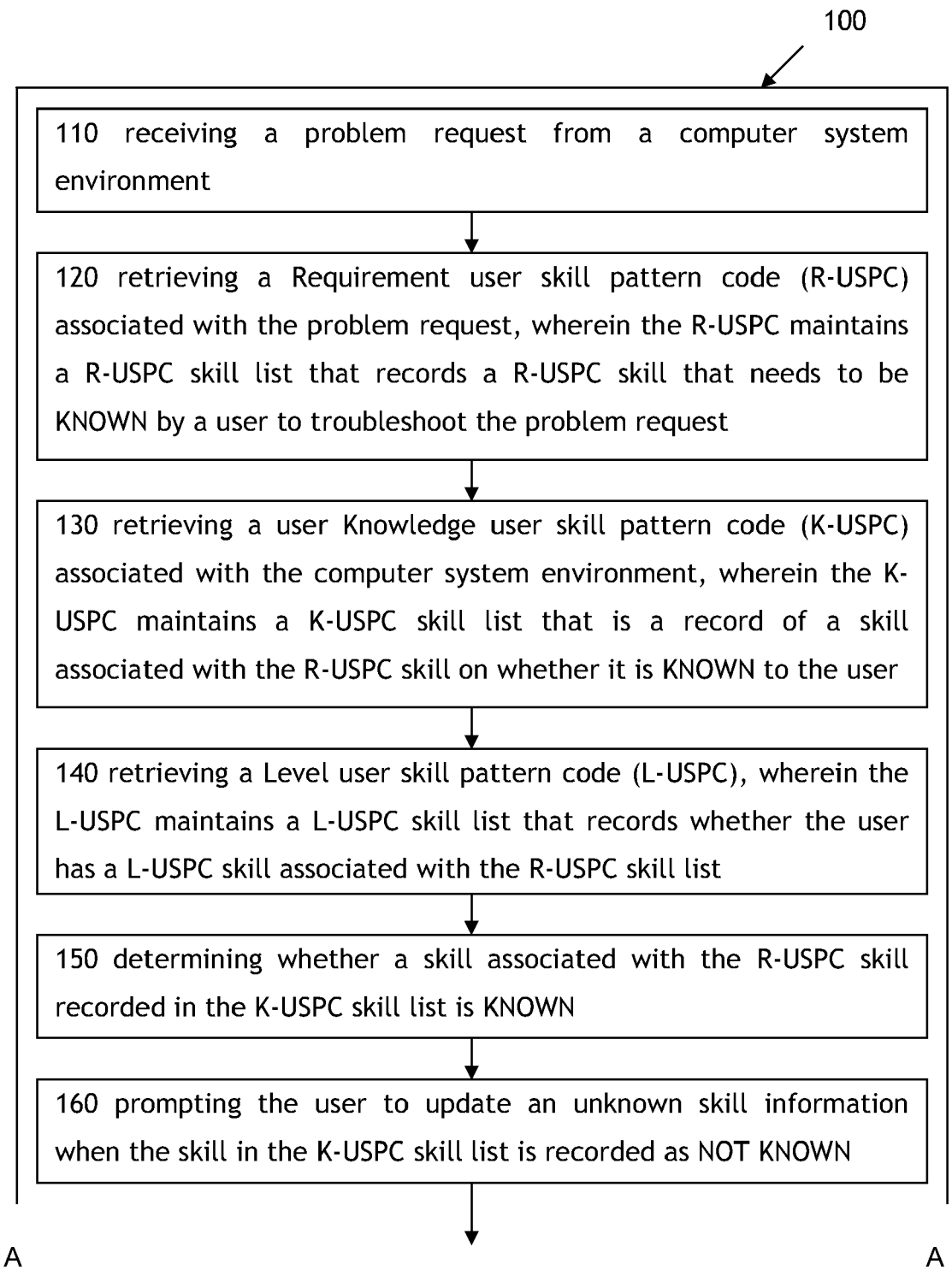
FIG. 1A is a flow chart illustrating the method for automatically adapting the problem shooting process.

Referring to FIG. 1A, once the method for automatically adapting the problem shooting process is initiated 100, the method 100 receives a problem request from a computer system environment 110. The method 100 then retrieves a Requirement user skill pattern code (R-USPC) associated with the problem request wherein the R-USPC maintains a R-USPC skill list that records a R-USPC skill that needs to be known by a user to troubleshoot the problem request 120. Then, the method 100 retrieves a user Knowledge user skill pattern code (K-USPC) associated with the computer system environment, wherein the K-USPC maintains a K-USPC skill list that is a record of a skill associated with the R-USPC skill on whether it is known to the user 130. The method 100 then retrieves a Level user skill pattern code (L-USPC), wherein the L-USPC maintains a L-USPC skill list that lists whether the user has a L-USPC skill associated with the R-USPC skill list 140. Next, the method 100 determines whether a skill associated with the R-USPC skill recorded in the K-USPC skill list is known 150. The method 100 then prompts the user to update an unknown skill information when the skill in the K-USPC skill list is recorded as not known 160.

Figure 1B:
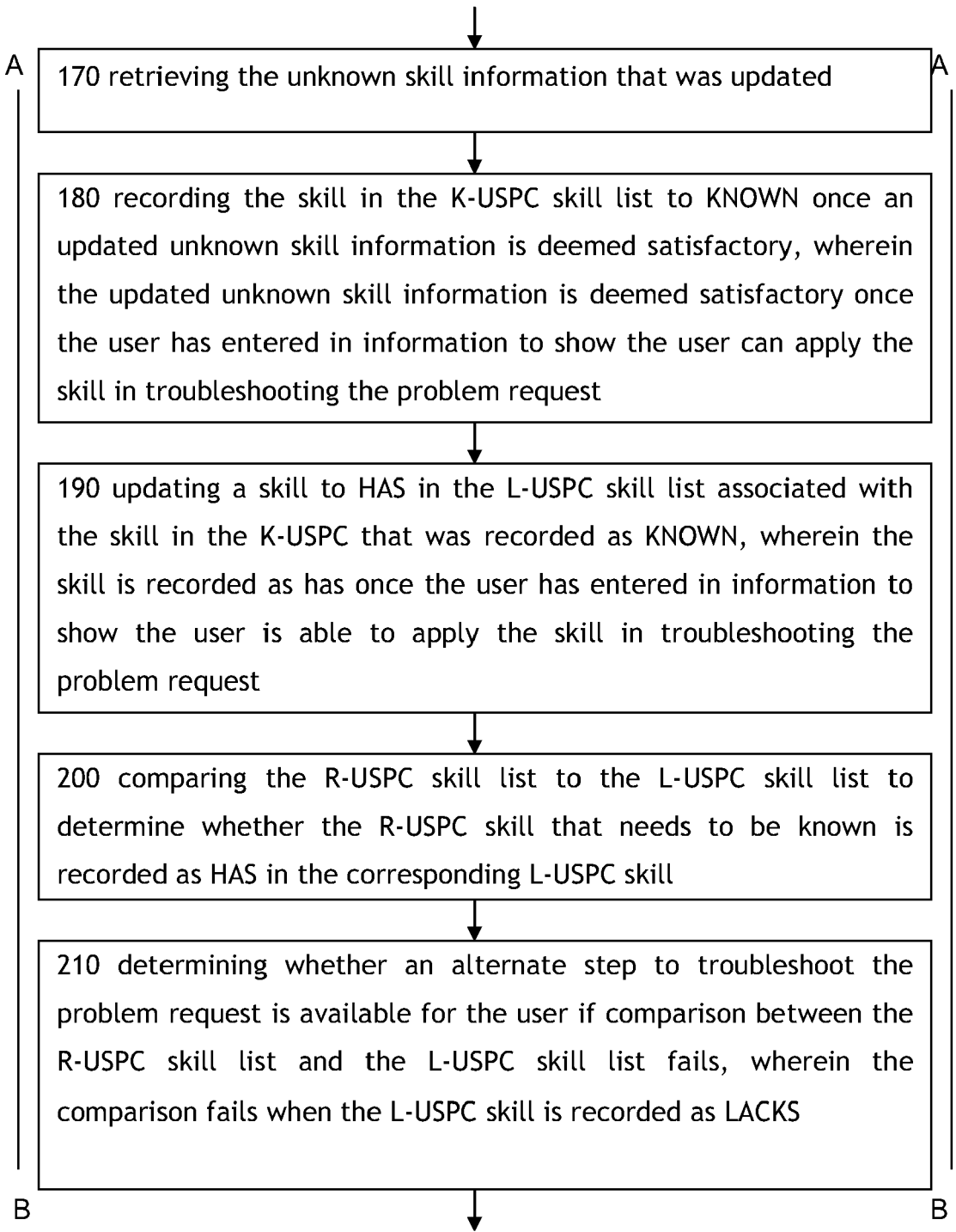
FIG. 1B is a flow chart illustrating the method for automatically adapting the problem shooting process.

Referring to FIG. 1B, the method 100 then retrieves the unknown skill information that was updated 170. Next, the method 100 records the skill in the K-USPC skill list to known once an updated unknown skill information is deemed satisfactory, wherein the updated unknown skill information is deemed satisfactory once the user has entered in information to show the user can apply the skill in troubleshooting the problem request 180. Then, method 100 updates a skill to has in the L-USPC skill list associated with the skill in the K-USPC that was recorded as known, wherein the skill is recorded as has once the user has entered in information to show the user is able to apply the skill in troubleshooting the problem request 190. The method 100 then compares the R-USPC skill list to the L-USPC skill list to determine whether the R-USPC skill that needs to be known is recorded as has in the corresponding L-USPC skill 200. The next step is determining whether an alternate step to troubleshoot the problem request is available for the user if comparison between the R-USPC skill list and the L-USPC skill list fails, wherein the comparison fails when the L-USPC skill is recorded as not have and the corresponding R-USPC skill is recorded as needs to be known 210.

Figure 1C:
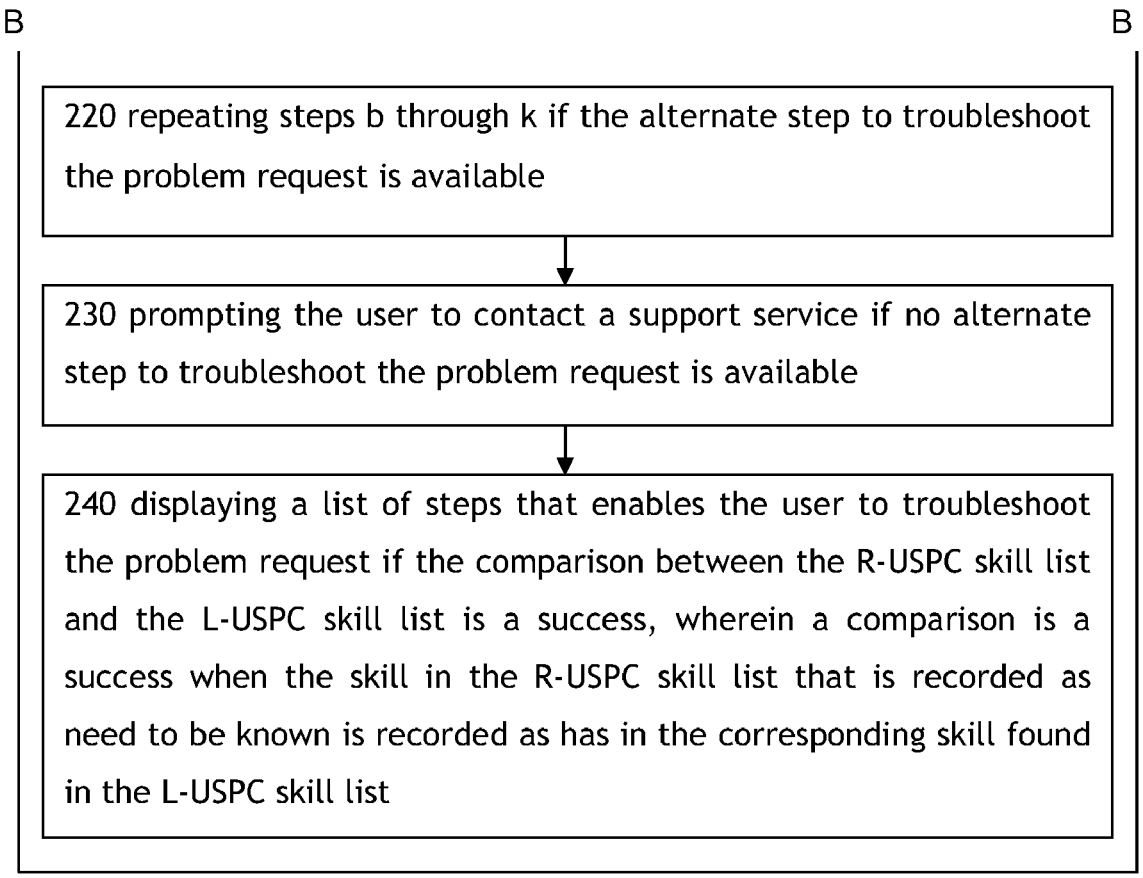
FIG. 1C is a flow chart illustrating the method for automatically adapting the problem shooting process.

Referring to FIG. 1C, if an alternate step is available, the method 100 will repeat elements 110-210 to determine the alternate step's skills and how they compare to the user's skills 220. If no alternate step is available, the method 100 will prompt the user to contact a support service 230. Finally, the method 100 displays a list of steps that enables the user to troubleshoot the problem request if the comparison between the R-USPC skill list and the L-USPC skill list is a success, wherein a comparison is a success when the skill in the R-USPC skill list that is recorded as need to be known is recorded as has in the corresponding skill found in the L-USPC skill list 240.

Assuming the bitmap format of user skill code—USPC—user skill pattern code, an example of the method for automatically adapting the problem shooting process is shown.

Definitions:
  a. Requirement-USPC (R-USPC): Indicates required skill
  b. Knowledge-USPC (K-USPC): Indicates whether the user's skill level is known or unknown c. Level-USPC (L-USPC): Indicates whether user has mastered this skill S1. A problem is reported to user. Starting from the most efficient list of steps in most efficient solution (usually requires more skills).

S2. For each step in the suggested solution (or self-help fixing steps)

S2-1. Use the step's Requirement-USPC (R-USPC) to find all skills needed, then user profile Knowledge-USPC (K-USPC) are checked to see if any skill required has unknown recorded.

S2-2. User is prompted with quick determination steps to fill in the unknown skill level information. Corresponding K-USPC bits and Level-USPC (L-USPC) bits are updated.

S2-3. Now compare the Requirement-USPC to L-USPC to see if all 1s (required skills for the step) in the R-USPC has corresponding 1s (user has the skill) in L-USPC.

S2-4. If user-skill doesn't meet the requirements of this step, and if alternate step exists to carry out the same results, go to S2-1 to do the matching again, otherwise go to S3 with a FAIL If user can carry out the step, check passed go on S2 for next step in solution.

S3. At end of the loop, we either get a FAIL or get a list of steps that forms a solution to guide user fix the problem.

If it is a FAIL, check any other alternative solutions with completely different set of steps and try again (go to S2).

If it is a FAIL and no more other solutions available, ask the user to contact the support service.

When it is a SUCCESS match, go on S4.

S4. Display the found list of steps that forms the solution to let user shoot the problem at his/her skill level just right.

S5. user follows the steps to get problem fixed in most efficient way that he/she have knowledge with, no customer service call needed.

Skill matching: The USP (user skill pattern) will be tracked for each user profile on the system. Each problem shooting step will also have a Requirement-USP assigned that indicates what skills are needed for the user to carry out the step. During the problem shooting process, the USP will be matched for each step. All skills that have no record of the user level info required by the step will be prompted and updated. Then if the problem shooting process identifies that the user is lacking some skills to carry out a step, either alternative steps are USP-matched to seek a fit, or a more detailed help can be provided for the step. Thus an adaptive, best-fit solution is structured for the specific user's skill level. This leads to customized, optimal problem-solving and user satisfaction because they are not given unnecessary details that they already know or too little detail for those who need more assistance. The user can also proactively update the USP as well.

System monitored skill tracking: A user-skill monitor could be active at all system up-time to track the user's activities. If user activity shows he/she has mastered a skill, (e.g. user used Linux/UNIX command "chmod" more than 3 times), then the corresponding USP will be updated automatically by the monitor for that user.

USP: The method for automatically adapting the problem shooting process may be kept in many formats, such as databases, bitmaps, etc.

As an example, a special code in bitmap format, USPC—user skill pattern code, will be tracked within the user profile. Two USPCs are kept in profile: the user skill info Knowledge-USPC will track whether a skill level info has been provided by the user, known and unknown, while the Level-USPC track whether the user HAS or LACKS the skill. And each problem shooting step will also have a Requirement-USPC built into it for checking the required skills involved. During the problem shooting process, the USPC code will be matched for each step. All skills that have no record of the user level info required by the step will be prompted and updated. Then if the problem shooting process identifies that the user is lacking some skills to carry out a step, either alternative steps are presented, or a more detailed (foolproof) help can be provided for the step. Thus an adaptive, best-fit solution is structured for the specific user's skill level. The user can also proactively update the USPC as well.

A user-skill monitor could be active at all system up-time to track the user activities. If user can meet the level of HAS, (e.g. user used Linux/UNIX command "chmod" more than 3 times), then the corresponding Knowledge-USPC bit and the Level-USPC bit will be updated automatically by the monitor for that user's profile.

Benefits:
a. No guessing of customer/user skill level needed. Less design phase confusion, and less phase design modification later.
b. Much more flexible, customized solution based on individual user skill levels. Increased efficiency for problem shooting by skilled users. Reduced service calls to vendor for users with lower technical knowledge.
c. Systematic control with a well designed skill code and intelligent matching process to automatically choose the most suitable route of problem shooting steps.
d. Overall more efficient software development process, less customer support/service cost, and smarter problem shooting interface.
e. Automatic collecting of user skill information.

In the present disclosure, the methods disclosed may be implemented as sets of instructions or software readable by a device. Further, it is understood that the specific order or hierarchy of steps in the methods disclosed are examples of exemplary approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:

1. A method, implemented as a set of instructions executed by a processing unit, for automatically adapting the problem shooting process, comprising:
a. receiving a problem request from a first computing system;
b. retrieving a Requirement user skill pattern code (R-USPC) associated with the problem request, wherein the R-USPC maintains a R-USPC skill list that records a R-USPC skill that needs to be known by a user to troubleshoot the problem request;
c. retrieving a user Knowledge user skill pattern code (K-USPC) associated with the first computing system, wherein the K-USPC maintains a K-USPC skill list that is a record of a skill on whether the skill is KNOWN to the user associated with the R-USPC skill;

d. retrieving a Level user skill pattern code (L-USPC), wherein the L-USPC maintains a L-USPC skill list that is a record of whether the user has a L-USPC skill associated with the R-USPC skill;

e. determining whether a skill associated with the R-USPC skill recorded in the K-USPC skill list is known;

f. prompting the user to update an unknown skill information when the skill in the K-USPC skill list is recorded as not known;

h. retrieving the unknown skill information that was updated;

i. recording the skill in the K-USPC skill list to known once an updated unknown skill information is deemed satisfactory, wherein the updated unknown skill information is deemed satisfactory once the user has entered in information to show the user is able to apply the skill in troubleshooting the problem request;

j. updating a skill to has in the L-USPC skill list associated with the skill in the K-USPC that was recorded as known, wherein the skill is recorded as has once the user has entered in information to show the user is able to apply the skill in troubleshooting the problem request;

k. comparing the R-USPC skill list to the L-USPC skill list to determine whether the R-USPC skill that needs to be known is recorded as has in the corresponding L-USPC skill;

l. determining whether an alternate step to troubleshoot the problem request is available for the user if comparison between the R-USPC skill list and the L-USPC skill list fails, wherein the comparison fails when the L-USPC skill is recorded as lacks because the user has never been recorded as knowing the skill;

m. repeating steps b through k if the alternate step to troubleshoot the problem request is available; and n. displaying a list of steps that enables the user to troubleshoot the problem request if the comparison between the R-USPC skill list and the L-USPC skill list is a success, wherein a comparison is a success when the skill in the R-USPC skill list that is recorded as need to be known is recorded as has in the corresponding skill found in the L-USPC skill list.

2. The method of claim 1, wherein the method further includes:
prompting the user to contact a support service if no alternate step to troubleshoot the problem request is available.

3. The method of claim 1, wherein the method further includes:
reporting information associated with the problem request to the user.

4. The method of claim 1, wherein the method further includes:
determining a most efficient solution for the problem request.

5. The method of claim 4, wherein the method further includes:
retrieving a Requirement user skill pattern code (R-USPC) associated with the most efficient solution for the problem request.

6. The method of claim 4, wherein the method further includes:
determining a most efficient list of steps of the most efficient solution.

7. The method of claim 6, wherein the method further includes:
retrieving a Requirement user skill pattern code (R-USPC) associated with each step of the most efficient list of steps of the most efficient solution for the problem request.

8. The method of claim 1, wherein the method further includes:
prompting the user with quick determination steps to fill in the unknown skill information.

9. The method of claim 1, wherein the method further includes:
providing more detailed steps to troubleshoot the problem request if comparison between the R-USPC skill list and the L-USPC skill list fails.

10. The method of claim 1, wherein the method further includes:
tracking a User skill pattern (USP) for each of a plurality of user profiles.

11. The method of claim 10, wherein the method further includes:
proactively updating the USP of the user.

12. The method of claim 10, wherein the method further includes:
tracking activities of the user utilizing a user-skill monitor, wherein the user-skill monitor is active during up-time of the computer system environment.

13. The method of claim 12, wherein the method further includes:
updating the USP of the user utilizing information associated with activities tracked by the user-skill monitor.

14. The method of claim 13, wherein the method further includes:
updating the USP of the user when the user-skill monitor tracks activities indicating the user can meet the level of HAS for a skill.

15. The method of claim 14, wherein the method further includes:
updating a skill associated with activities tracked by the user-skill monitor to HAS in the L-USPC skill list.

16. The method of claim 14, wherein the method further includes:
updating a skill associated with activities tracked by the user-skill monitor to KNOWN in the K-USPC skill list.

17. The method of claim 1, wherein the method further includes:
utilizing a database to maintain information associated with R-USPC, K-USPC, or L-USPC.

18. The method of claim 17, wherein the method further includes:
utilizing a database to maintain information associated with R-USPC, K-USPC, and L-USPC.

19. The method of claim 1, wherein the method further includes:
utilizing a bitmap to maintain information associated with R-USPC, K-USPC, or L-USPC.

20. The method of claim 19, wherein the method further includes:
utilizing a bitmap to maintain information associated with R-USPC, K-USPC, and L-USPC.

* * * * *